United States Patent
Naito et al.

(10) Patent No.: US 8,510,484 B2
(45) Date of Patent: Aug. 13, 2013

(54) CONTENT TRANSMISSION APPARATUS, CONTENT PLAYBACK SYSTEM, CONTENT TRANSMISSION METHOD, AND PROGRAM

(75) Inventors: Masahiko Naito, Tokyo (JP); Katsutoshi Itoh, Tokyo (JP); Hiroyuki Suzuki, Kanagawa (JP); Norifumi Kikkawa, Tokyo (JP); Hideyuki Suzuki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/065,542

(22) Filed: Mar. 24, 2011

(65) Prior Publication Data

US 2011/0246689 A1    Oct. 6, 2011

(30) Foreign Application Priority Data

Mar. 31, 2010   (JP) ................................ P2010-082046

(51) Int. Cl.
    *G06F 5/00*    (2006.01)
    *G06F 3/00*    (2006.01)
    *G06F 15/173*  (2006.01)

(52) U.S. Cl.
    USPC ............................. 710/59; 710/58; 709/225

(58) Field of Classification Search
    None
    See application file for complete search history.

(56) References Cited

U.S. PATENT DOCUMENTS

| | | | |
|---|---|---|---|
| 6,307,842 B1 | 10/2001 | Nakata et al. | |
| 7,505,476 B2 * | 3/2009 | Okagawa et al. | 370/413 |
| 7,617,386 B2 * | 11/2009 | May et al. | 712/225 |
| 7,664,145 B2 * | 2/2010 | Akamatsu et al. | 370/516 |
| 2002/0052957 A1 * | 5/2002 | Shimada | 709/225 |
| 2002/0083173 A1 * | 6/2002 | Musoll et al. | 709/225 |
| 2002/0152338 A1 * | 10/2002 | Elliott et al. | 710/34 |
| 2004/0199659 A1 * | 10/2004 | Ishikawa et al. | 709/235 |
| 2005/0233789 A1 * | 10/2005 | Maekawa | 463/1 |
| 2006/0075467 A1 * | 4/2006 | Sanda et al. | 726/1 |
| 2006/0120378 A1 * | 6/2006 | Usuki et al. | 370/395.4 |
| 2007/0067812 A1 * | 3/2007 | Watanabe | 725/90 |
| 2007/0211623 A1 * | 9/2007 | Nishioka | 370/218 |
| 2008/0313682 A1 * | 12/2008 | Kajiura | 725/93 |
| 2009/0172182 A1 * | 7/2009 | Yoon | 709/231 |
| 2009/0271834 A1 * | 10/2009 | Asmussen | 725/106 |
| 2011/0222474 A1 * | 9/2011 | Kikkawa et al. | 370/328 |
| 2012/0311043 A1 * | 12/2012 | Chen et al. | 709/204 |

FOREIGN PATENT DOCUMENTS

JP    3834897 A    6/1998

* cited by examiner

*Primary Examiner* — Henry Tsai
*Assistant Examiner* — Michael Sun
(74) *Attorney, Agent, or Firm* — Lerner, David, Littenberg, Krumholz & Mentlik, LLP

(57) ABSTRACT

There is provided a content transmission apparatus including a reception unit for performing a receiving process for receiving, from a content output apparatus, a transmission instruction that is based on an output order of pieces of content data, a transmission unit for starting transmission of content data to the content output apparatus in response to the transmission instruction, and a control unit for controlling a time interval for causing the reception unit to perform the receiving process, according to wait information indicating a status of wait until transmission of the content data to the content output apparatus is to be started.

13 Claims, 11 Drawing Sheets

FIG.7

| SONGS IN QUEUE | INTERMITTENT RECEPTION CYCLE (ms) |
|---|---|
| 1 | 100 |
| 2 | 1000 |
| 3 | 5000 |
| 4 OR MORE | 10000 |

FIG.9

| WAIT TIME T | INTERMITTENT RECEPTION CYCLE (ms) |
|---|---|
| T < 1 MIN | 100 |
| 1 MIN ≦ T < 3 MIN | 1000 |
| 3 MIN ≦ T < 5 MIN | 5000 |
| 5 MIN ≦ T | 10000 |

FIG.11

| SONGS IN QUEUE | DISCONNECTION TIME (ms) |
|---|---|
| 1 | 6000 |
| 2 | 12000 |
| 3 | 18000 |
| 4 OR MORE | 24000 |

CONTENT TRANSMISSION APPARATUS, CONTENT PLAYBACK SYSTEM, CONTENT TRANSMISSION METHOD, AND PROGRAM

CROSS-REFERENCE TO RELATED APPLICATION

The present application claims priority from Japanese Patent Application No. JP 2010-082046 filed in the Japanese Patent Office on Mar. 31, 2010, the entire content of which is incorporated herein by reference.

BACKGROUND OF THE INVENTION

1. Field of the Invention

The present invention relates to a content transmission apparatus, a content playback system, a content transmission method, and a program.

2. Description of the Related Art

In the past, to transmit content such as music or video to another apparatus, a transmission source and a transmission destination of the content were connected by a cable and transmission was performed via the cable. For example, Japan Patent No. 3834897 describes an audio-visual (AV) system that inputs/outputs video signals and audio signals by an interface specified in Institute of Electrical and Electronic Engineers (IEEE) 1394.

SUMMARY OF THE INVENTION

On the other hand, with the development in wireless communication, a content playback system that is capable of transmitting content by using wireless communication is being proposed. Normally, a content transmission apparatus that transmits content to an output apparatus starts transmission of the content to the output apparatus in response to a transmission instruction from the output apparatus. There was an issue that, in a wait state until the transmission start, wasteful power consumption in relation to a receiving process was highly possible for a content transmission apparatus experiencing a long wait time. Low power consumption performance is increasingly desired particularly for a portable apparatus driven by a battery.

In light of the foregoing, it is desirable to provide a content transmission apparatus, a content playback system, a content transmission method, and a program which are novel and improved, and which are capable of reducing power consumption according to a status of wait until content transmission to a content output apparatus is to be started.

According to an embodiment of the present invention, there is provided a content transmission apparatus which includes a reception unit for performing a receiving process for receiving, from a content output apparatus, a transmission instruction that is based on an output order of pieces of content data, a transmission unit for starting transmission of content data to the content output apparatus in response to the transmission instruction, and a control unit for controlling a time interval for causing the reception unit to perform the receiving process, according to wait information indicating a status of wait until transmission of the content data to the content output apparatus is to be started.

The control unit may cause the reception unit to perform the receiving process, in accordance with an intermittent reception cycle according to the wait information.

The reception unit may receive the wait information from the content output apparatus. The control unit may determine the intermittent reception cycle based on the received wait information.

The reception unit may receive the intermittent reception cycle determined by the content output apparatus based on the wait information from the content output apparatus. The control unit may cause the reception unit to perform the receiving process according to the received intermittent reception cycle.

The wait information may include at least either value of a wait time until start of transmission of the content data to the content output apparatus and the number of content pieces in queue. The intermittent reception cycle may be determined to be longer as the value included in the wait information is larger.

The control unit may perform a process of reconnection to the content output apparatus after a disconnection time according to the wait information has elapsed since connection with the content output apparatus was disconnected.

The control unit may determine the disconnection time in accordance with the wait information, and performs, after the determined disconnection time has elapsed, the process of reconnection to the content output apparatus.

The reception unit may receive the disconnection time according to the wait information from the content output apparatus. The control unit may perform, after the received disconnection time has elapsed, the process of reconnection to the content output apparatus.

The control unit may perform control such that power supply to a communication module including the transmission unit and the reception unit is stopped during a disconnection time according to the wait information.

According to another embodiment of the present invention, there is provided a content playback system which includes a content output apparatus for managing an output order of pieces of content data, giving a transmission instruction to a content transmission apparatus having content data to be output, based on the output order, and outputting the content received from the content transmission apparatus, and the content transmission apparatus including a reception unit for performing a receiving process for receiving the transmission instruction, a transmission unit for starting transmission of content data to the content output apparatus in response to the transmission instruction, and a control unit for controlling a time interval for causing the reception unit to perform the receiving process, according to wait information indicating a status of wait until transmission of the content data to the content output apparatus is to be started.

According to another embodiment of the present invention, there is provided a content transmission method which includes the steps of performing, by a content transmission apparatus, a receiving process at a time interval according to wait information indicating a status of wait until transmission of content data to a content output apparatus is to be started, giving, by the content output apparatus, a transmission instruction to the content transmission apparatus based on a position of content data in an output order, and starting, by the content transmission apparatus, transmission of the content data to the content output apparatus in response to the transmission instruction.

According to another embodiment of the present invention, there is provided a program for causing a computer to function as a content transmission apparatus including a reception unit for performing a receiving process for receiving, from a content output apparatus, a transmission instruction that is based on an output order of pieces of content data, a transmission unit for starting transmission of content data to the content output apparatus in response to the transmission instruction, and a control unit for controlling a time interval for causing the reception unit to perform the receiving process, according to wait information indicating a status of wait until transmission of the content data to the content output apparatus is to be started.

According to the embodiments of the present invention described above, it is possible to reduce power consumption according to a status of wait until content transmission to a content output apparatus is to be started.

BRIEF DESCRIPTION OF THE DRAWINGS

FIG. 7 is a table showing a relationship between the number of songs in queue and an intermittent reception cycle, used by a content transmission apparatus in the first operation example;

FIG. 9 is a table showing a relationship between the number of songs in queue and an intermittent reception cycle, used by a content transmission apparatus in the second operation example;

FIG. 11 is a table showing a relationship between the number of songs in queue and a disconnection time, used by a content transmission apparatus in a modified example of the third operation example.

DETAILED DESCRIPTION OF THE EMBODIMENT

Figure 1:
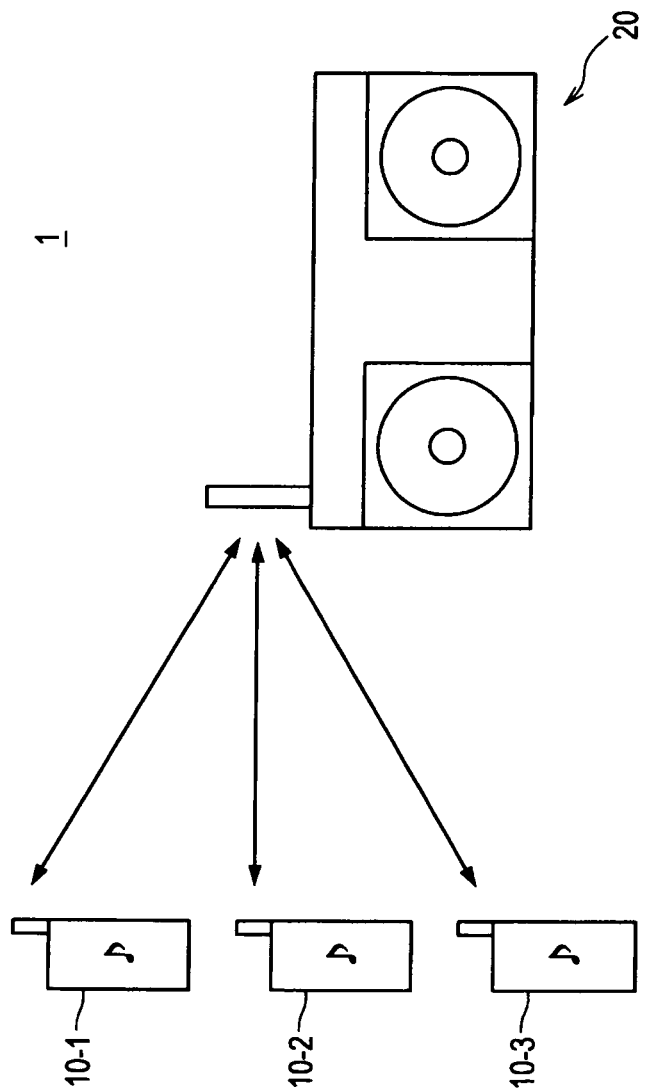
FIG. 1 is an explanatory diagram showing a configuration of a content playback system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, in this specification and the drawings, a plurality of structural elements having substantially the same functional configuration may be distinguished from each other by each having a different number added, after a hyphen, to the same reference numeral. For example, a plurality of elements having substantially the same functional configuration are distinguished from each other as necessary, such as a content transmission apparatus 10-1 and a content transmission apparatus 10-2. However, if it is not particularly necessary to distinguish each of a plurality of structural elements having substantially the same functional configuration, only the same reference numeral is assigned. For example, if it is not particularly necessary to distinguish between the content transmission apparatus 10-1 and the content transmission apparatus 10-2, they are simply referred to as the content transmission apparatuses 10.

Additionally, description will be made in the order below.
1. Overview of System
2. Configuration of Content Transmission Apparatus
3. Configuration of Content Output Apparatus
4. Operation Example
4-1. First Operation Example
4-2. Second Operation Example
4-3. Third Operation Example
5. Example of Effect 1. Overview of System First, a schematic configuration of a content playback system according to a first embodiment of the present invention will be described with reference to FIG. 1. FIG. 1 is an explanatory diagram showing a configuration of a content playback system according to an embodiment of the present invention. A content playback system 1 according to the present embodiment includes a content transmission apparatus 10-1, a content transmission apparatus 10-2, a content transmission apparatus 10-3, and a content output apparatus 20.

The content transmission apparatus 10-1, the content transmission apparatus 10-2, the content transmission apparatus 10-3, and the content output apparatus 20 are wireless communication apparatuses capable of connecting to each other according to Wi-Fi Direct specification. A wireless communication apparatus acting as a Group Owner in Wi-Fi Direct functions as the content output apparatus 20, and a wireless communication apparatus acting as a Client functions as the content transmission apparatus 10.

For example, as shown in FIG. 1, with a mobile phone with a small speaker and a music playback apparatus with a large speaker, both having a music playback function, it is desirable that the music playback apparatus with a large speaker functions as the content output apparatus 20 and the mobile phone with a small speaker functions as the content transmission apparatus 10.

The content output apparatus 20 has an output unit, such as a speaker, and accepts a music playback reservation from the content transmission apparatus 10. Also, the content output apparatus 20 manages the output order of pieces of music content data for which playback reservations have been made. The content output apparatus 20 transmits, to the content transmission apparatus 10 that has music content data whose turn to be played back has come, a transmission instruction for the content data. Then, the content output apparatus 20 outputs, from a speaker, the content data that the content transmission apparatus 10 has transmitted in response to the transmission instruction.

The content transmission apparatus 10-1, the content transmission apparatus 10-2, and the content transmission apparatus 10-3 have music content data, and transmit, in response to the transmission instruction, the content data to the content output apparatus 20 via wireless connection.

Figure 2:
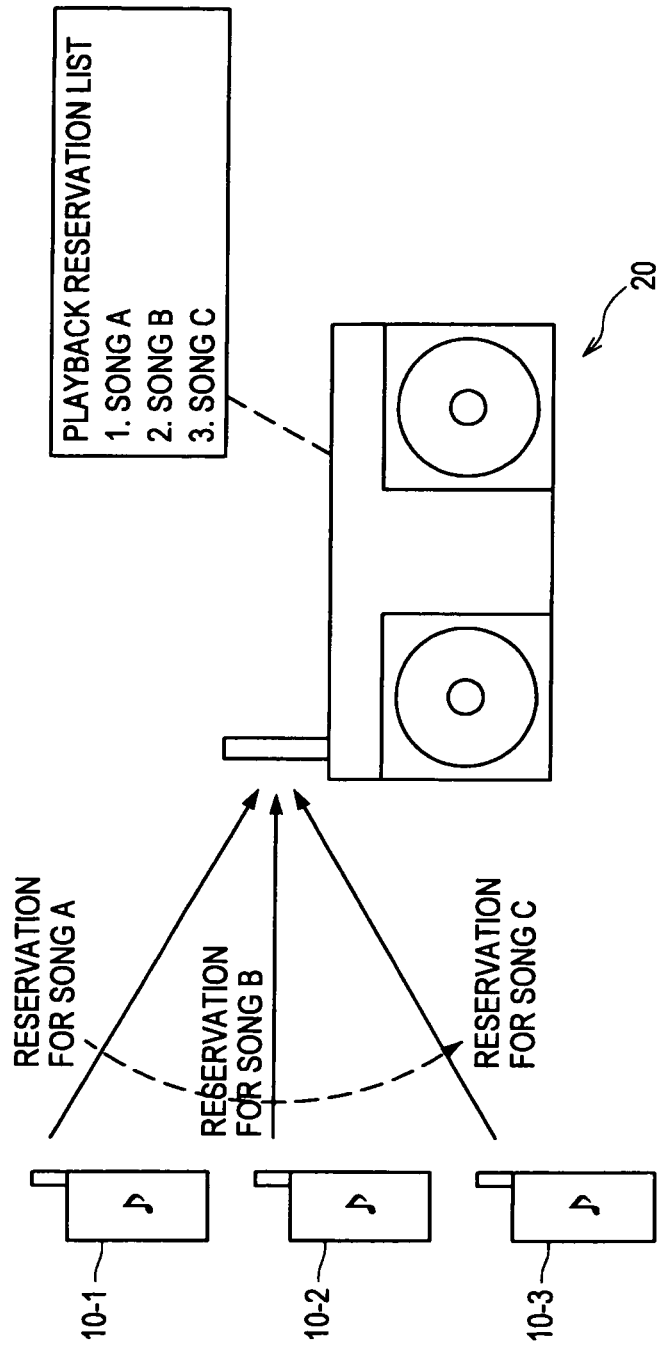
FIG. 2 is an explanatory diagram showing an overview of a content playback system according to an embodiment of the present invention.
Figure 3:
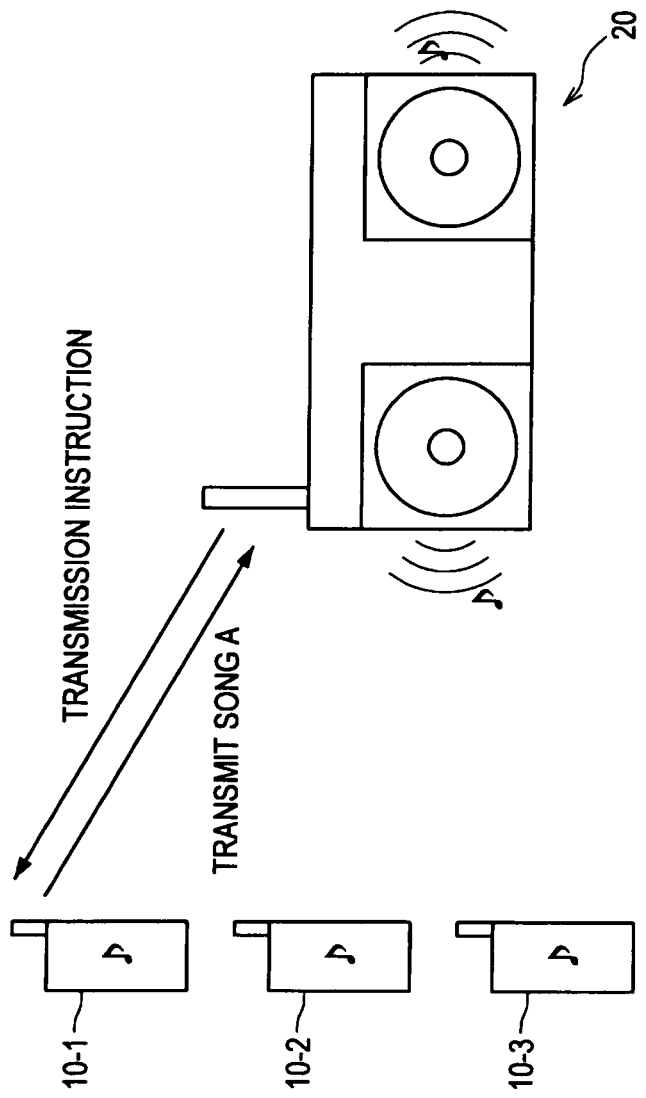
FIG. 3 is an explanatory diagram showing an overview of a content playback system according to an embodiment of the present invention.

Next, an example of an operation performed, in the content playback system 1 having the configuration described above, in a case the content transmission apparatus 10-1, the content transmission apparatus 10-2, and the content transmission apparatus 10-3 make playback reservations for outputting content data of music content pieces that are held by themselves from the speaker of the content output apparatus 20 will be described with reference to FIGS. 2 and 3. FIGS. 2 and 3 are explanatory diagrams showing overviews of a content playback system according to an embodiment of the present invention.

Referring to FIG. 2, for example, the content transmission apparatus 10-1, the content transmission apparatus 10-2, and the content transmission apparatus 10-3 respectively make a playback reservation to output music from the speaker of the content output apparatus 20. This playback reservation is made by pressing push buttons (not shown) of the content transmission apparatus 10 and the content output apparatus 20, for example.

For example, playback reservations are made for song A, song B, and song C respectively by the content transmission apparatus 10-1, the content transmission apparatus 10-2, and the content transmission apparatus 10-3 in this order. At this point, the content output apparatus 20 manages, by a playback reservation list, the order of outputting the content data of the music pieces for which reservations have been made. Then, the content output apparatus 20 first transmits a transmission instruction to the content transmission apparatus 10-1 having the content data of song A described at the top of the playback reservation list. Then, the content transmission apparatus 10-1 starts transmission of the content data to the content output apparatus 20 in response to the transmission instruction. When the content data is received from the content transmission apparatus 10-1, the content output apparatus 20 outputs the received content data. The content playback system 1 can output content held by the content transmission apparatus 10 from the speaker of the content output apparatus 20 in this manner.

While the content output apparatus 20 is outputting the content data transmitted from the content transmission apparatus 10-1, the content transmission apparatus 10-2 and the content transmission apparatus 10-3 are in a wait state. When the output of the content data of song A is complete, the content output apparatus 20 next transmits a transmission instruction to the content transmission apparatus 10-2 having the content data of song B described after song A in the playback reservation list. At the time of transmitting the transmission instruction, the content output apparatus 20 notifies the content transmission apparatus 10-2 in advance that there is transmission data for the content transmission apparatus 10-2 by using TIM information of a beacon signal. Then, the content output apparatus 20 transmits the transmission instruction when the content transmission apparatus 10-2 reaches a state where reception is possible. In this manner, the content output apparatus 20 controls transmission of content data by the content transmission apparatuses 10 by accepting content playback reservations from a plurality of content transmission apparatuses 10 and transmitting, based on the output order of content pieces, the transmission instruction for content to the content transmission apparatus 10 whose turn in the output order has come.

At this time, the content transmission apparatus 10-2 and the content transmission apparatus 10-3 intermittently perform receiving processes to receive traffic indication message (TIM) information included in beacon signals transmitted from the content output apparatus 20 and to know whether there is transmission data for themselves. The transmission cycle of the beacon signal including the TIM information is normally about 100 ms, but for playback of music content or video content, at least several minutes are generally taken per one content piece. Accordingly, if this receiving process is performed at every timing of beacon signal transmission, power will be consumed unnecessarily.

Thus, the content transmission apparatus 10 according to the present embodiment reduces power consumption by controlling the time interval between the receiving processes. The time interval between receiving processes can be controlled by, for example, changing the value of the intermittent reception cycle or switching between connection and disconnection of communication. The configuration of the content transmission apparatus 10 for realizing this function will be described next.

2. Configuration of Content Transmission Apparatus>

Figure 4:
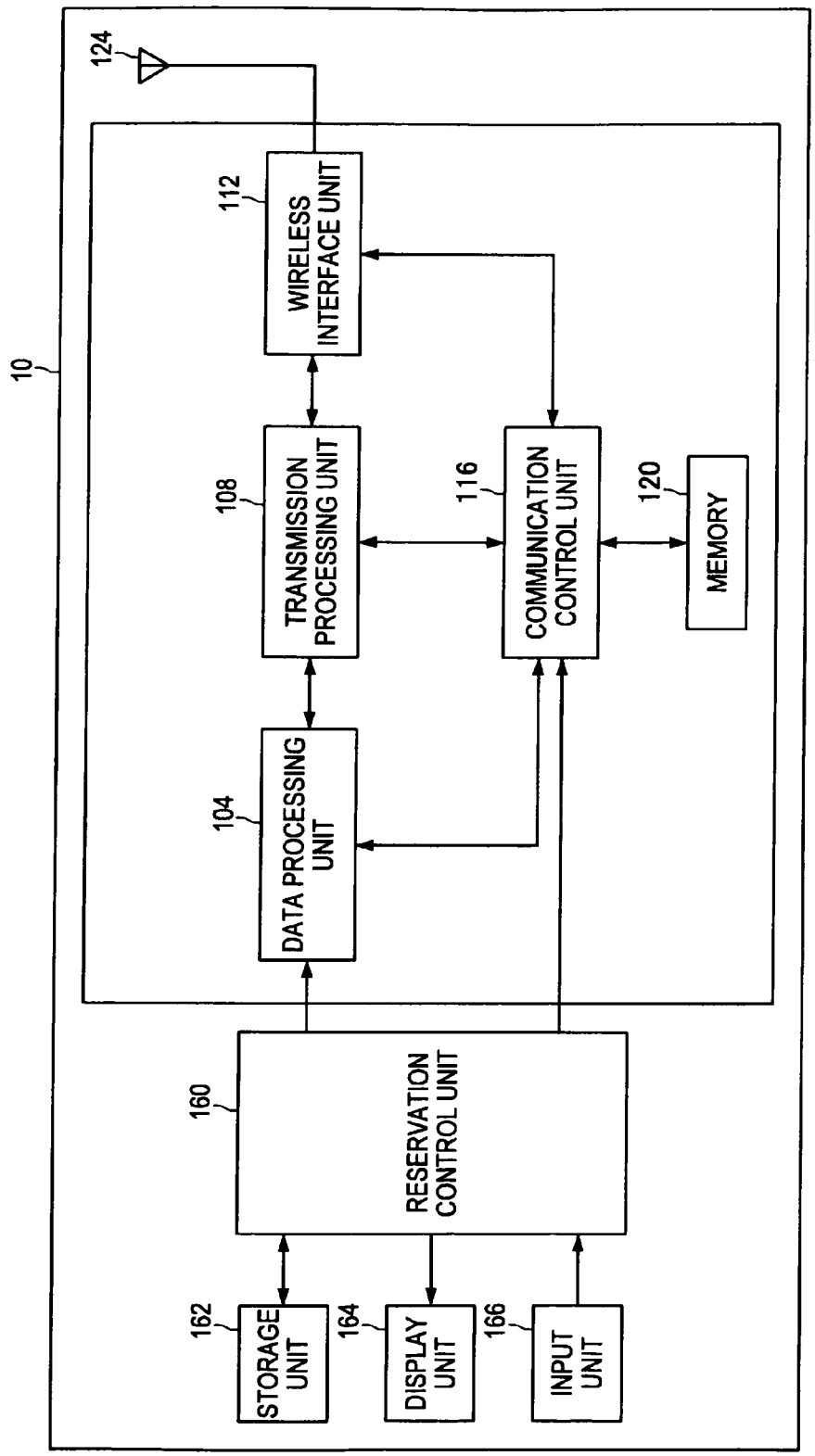
FIG. 4 is a block diagram showing a configuration of a content transmission apparatus according to an embodiment of the present invention.

FIG. 4 is a block diagram showing a configuration of the content transmission apparatus 10. The content transmission apparatus 10 according to the present embodiment mainly includes a data processing unit 104, a transmission processing unit 108, a wireless interface unit 112, a communication control unit 116, a memory 120, an antenna 124, a reservation control unit 160, a storage unit 162, a display unit 164, and an input unit 166.

Among the above, the data processing unit 104, the transmission processing unit 108, the wireless interface unit 112, and the antenna 124 will function as a transmission unit or a reception unit when the communication control unit 116 controls their operations.

At the time of receiving a wireless signal, the wireless interface unit 112 decodes various data frames by downconverting a wireless signal received by the antenna 124 and converting the same to a bit string. When it is checked that there is no error in the various data frames supplied by the wireless interface unit 112, the transmission processing unit 108 supplies the various data frames to the data processing unit 104. The data processing unit 104 processes and analyses the various data frames and data packets supplied from the transmission processing unit 108.

Also, at the time of transmitting a wireless signal, the data processing unit 104 generates various data frames or data packets according to a request from the content output apparatus 20 or the like, for example, and supplies the same to the transmission processing unit 108. The transmission processing unit 108 performs processing such as addition of various data headers and error detection codes such as a frame check sequence (FCS) on the packets generated by the data processing unit 104, and supplies the data after processing to the wireless interface unit 112. The wireless interface unit 112 generates, from the data received from the transmission processing unit 108, a modulation signal in the frequency range of a carrier wave, and causes the antenna 124 to transmit the same as a wireless signal.

The communication control unit 116 controls the operations of the data processing unit 104, the transmission processing unit 108, the wireless interface unit 112, and the antenna 124, and causes them to function as a reception unit or a transmission unit. For example, in response to an instruction from the reservation control unit 160, the communication control unit 116 controls the operations of the data processing unit 104, the transmission processing unit 108, the wireless interface unit 112, and the antenna 124, and causes them to function as a transmission unit for transmitting a playback reservation message. Or, when waiting for start of playback after making a playback reservation, the communication control unit 116 controls the operations of the data processing unit 104, the transmission processing unit 108, the wireless interface unit 112, and the antenna 124, and controls the time interval between the receiving processes according to wait information indicating the status of wait until transmission of content data to the content output apparatus 20 is to be started. Specifically, the communication control unit 116 controls the operations of the data processing unit 104, the transmission processing unit 108, the wireless interface unit 112, and the antenna 124 such that the receiving process is performed at an intermittent reception cycle according to the wait information. Or, the communication control unit 116 controls the time interval between the receiving processes by temporarily disconnecting the communication with the content output apparatus 20, according to the wait information.

The memory 120 undertakes a role of a work area for data processing by the communication control unit 116, or has a function of a storage medium for holding various types of data. The memory 120 may be a storage medium such as a non-volatile memory, a magnetic disk, an optical disk, or a magneto-optical (MO) disk. The non-volatile memory may be, for example, a flash memory, an electrically erasable programmable read-only memory (EEPROM), or an erasable programmable read-only memory (EPROM). Also, the magnetic disk may be a hard disk, a discoid magnetic disk, or the like. Furthermore, the optical disk may be a compact disc (CD), a digital versatile disc recordable (DVD-R), a Blu-ray disc (BD; registered trademark), or the like.

The reservation control unit 160 makes a playback reservation for content to the content output apparatus 20 based on operation information from the input unit 166. Specifically, the reservation control unit 160 makes the display unit 164 display a playback reservation screen, generates a playback reservation message by acquiring a playback reservation operation of a user via the input unit 166, and instructs the communication control unit 116 to transmit the generated playback reservation message to the content output apparatus 20. Also, when a transmission instruction is received from the content output apparatus 20, the reservation control unit 160 acquires content data from the storage unit 162, and instructs the communication control unit 116 to transmit the same to the content output apparatus 20, in response to the transmission instruction.

The storage unit 162 has a function of a storage medium for storing content data, for example. The storage unit 162 may be a storage medium such as a non-volatile memory, a magnetic disk, an optical disk, or a magneto-optical (MO) disk. The non-volatile memory may be, for example, a flash memory, an electrically erasable programmable read-only memory (EEPROM), or an erasable programmable read-only memory (EPROM). Also, the magnetic disk may be a hard disk, a discoid magnetic disk, or the like. Furthermore, the optical disk may be a compact disc (CD), a digital versatile disc recordable (DVD-R), a Blu-ray disc (BD; registered trademark), or the like.

The display unit 164 is an example of an output apparatus for outputting various types of information to a user according to control by the reservation control unit 160. For example, the content transmission apparatus 10 may itself display a list of content data in the storage unit 162, and have a user select content data to be output from the content output apparatus 20. Or, a playback reservation list managed by the content output apparatus 20 may be acquired from the content output apparatus 20, and be displayed by the display unit 164.

The input unit 166 is configured from input means for a user to input information, such as a mouse, a keyboard, a touch panel, a button, a microphone, a switch, or a lever, an input control circuit that generates an input signal based on input from the user and outputs the same to a CPU (not shown), and the like. The user of the content transmission apparatus 10 can input various types of data to the content transmission apparatus 10 or instruct processing operations thereto by operating the input means.

Additionally, the functions of the communication control unit 116 and the reservation control unit 160 are achieved, in reality, by an arithmetic apparatus such as a central processing unit (CPU) not shown reading out a control program from a storage medium, such as a read only memory (ROM), a random access memory (RAM), or the like, storing a control program describing processing for realizing these functions, and interpreting and carrying out the program.

3. Configuration of Content Output Apparatus

Figure 5:
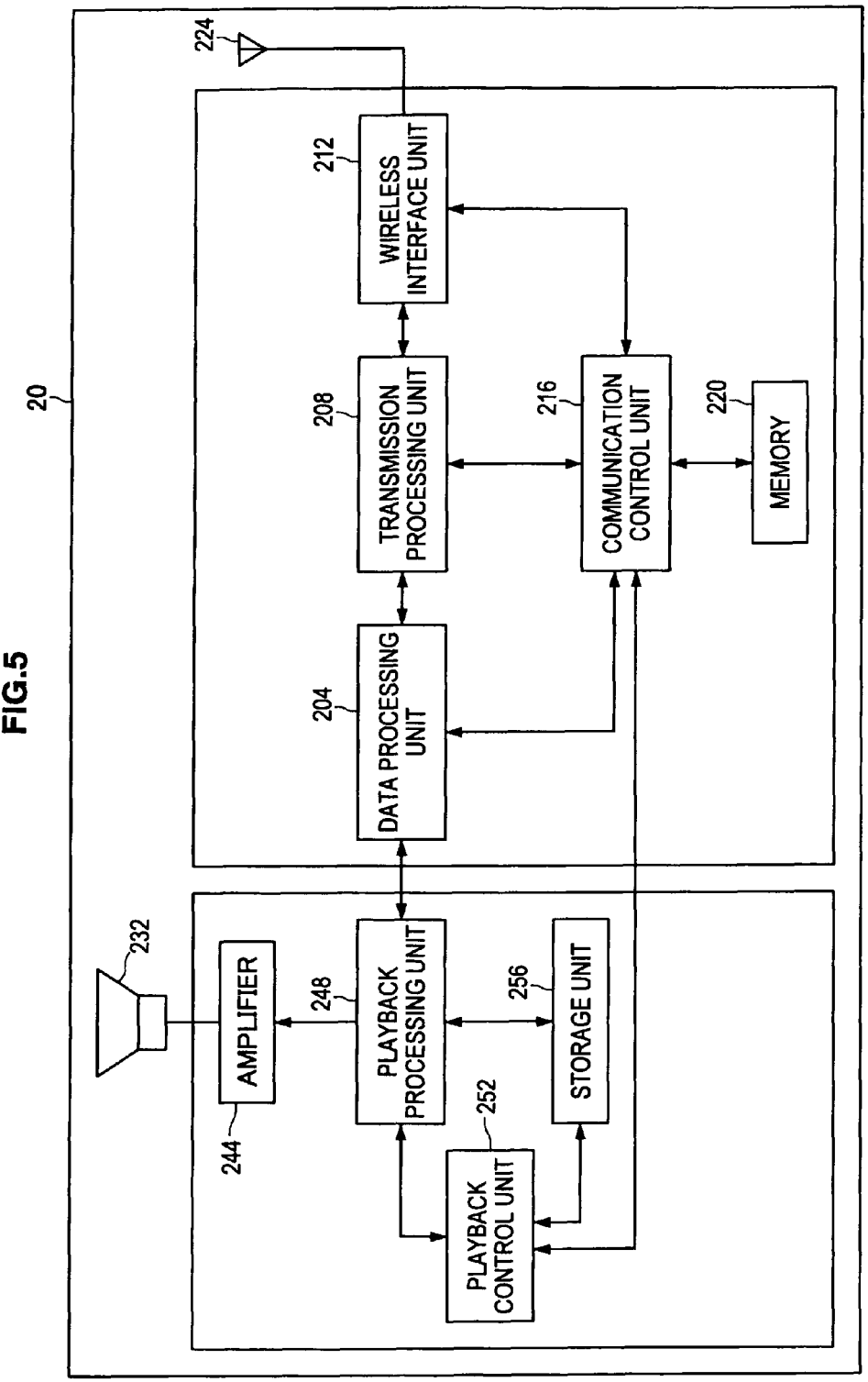
FIG. 5 is a block diagram showing a configuration of a content output apparatus according to an embodiment of the present invention.

FIG. 5 is a block diagram showing a configuration of the content output apparatus 20. The content output apparatus 20 according to the present embodiment mainly includes a data processing unit 204, a transmission processing unit 208, a wireless interface unit 212, a communication control unit 216, a memory 220, an antenna 224, a speaker 232, an amplifier 244, a playback processing unit 248, a playback control unit 252, and a storage unit 256.

Among the above, the data processing unit 204, the transmission processing unit 208, the wireless interface unit 212, and the antenna 224 will function as a transmission unit or a reception unit when the communication control unit 216 controls their operations.

At the time of receiving a wireless signal, the wireless interface unit 212 decodes various data frames by down-converting a wireless signal received by the antenna 224 and converting the same to a bit string. When it is checked that there is no error in the various data frames supplied by the wireless interface unit 212, the transmission processing unit 208 supplies the various data frames to the data processing unit 204. The data processing unit 204 processes and analyses the various data frames and data packets supplied from the transmission processing unit 208.

Also, at the time of transmitting a wireless signal, the data processing unit 204 generates various data frames or data packets according to a request from the playback processing unit 248 or the like, for example, and supplies the same to the transmission processing unit 208. The transmission processing unit 208 performs processing such as addition of various data headers and error detection codes such as a frame check sequence (FCS) on the packets generated by the data processing unit 204, and supplies the data after processing to the wireless interface unit 212. The wireless interface unit 212 generates, from the data received from the transmission processing unit 208, a modulation signal in the frequency range of a carrier wave, and causes the antenna 224 to transmit the same as a wireless signal.

For example, when a playback reservation message or content data is received from the content transmission apparatus 10, the communication control unit 216 transfers the received information to the playback control unit 252. Also, the communication control unit 216 transmits, in response to an instruction from the playback control unit 252, a transmission instruction to the content transmission apparatus 10 having content whose turn in the playback reservation list has come. Or, the communication control unit 216 transmits, to each content transmission apparatus 10, wait information indicating the status of wait until the content transmission apparatus 10 is to start transmission of content.

The memory 220 undertakes a role of a work area for data processing by the communication control unit 216, or has a function of a storage medium for holding various types of data. The memory 220 may be a storage medium such as a non-volatile memory, a magnetic disk, an optical disk, or a magneto-optical (MO) disk. The non-volatile memory may be, for example, a flash memory, an electrically erasable programmable read-only memory (EEPROM), or an erasable programmable read-only memory (EPROM). Also, the magnetic disk may be a hard disk, a discoid magnetic disk, or the like. Furthermore, the optical disk may be a compact disc (CD), a digital versatile disc recordable (DVD-R), a Blu-ray disc (BD; registered trademark), or the like.

The speaker 232 is an output apparatus for outputting playback data of content. In the present embodiment, a configuration having a speaker is taken as an example of the output apparatus, but the output apparatus is not limited to such. For example, the output apparatus may be a display, and may be able to output video content.

The amplifier 244 has a function of amplifying a signal input by the playback processing unit 248 and inputting the same to the speaker 232. Also, the playback processing unit 248 performs decoding processing or the like on content data which has been input. The playback control unit 252 has a function of performing control such that the playback processing unit 248 performs playback processing.

The storage unit 256 has a function of a storage medium for storing content data, for example. It may also functions as a storage medium for storing a playback reservation list. The storage unit 256 may be a storage medium such as a non-volatile memory, or a magnetic disk. The non-volatile memory may be, for example, a flash memory, an electrically erasable programmable read-only memory (EEPROM), or an erasable programmable read-only memory (EPROM). Also, the magnetic disk may be a hard disk, a discoid magnetic disk, or the like.

4. Operation Example

In the foregoing, the configurations of the content transmission apparatus 10 and the content output apparatus 20 according to an embodiment of the present invention have been described. As described above, the content transmission apparatus 10 reduces power consumption by controlling the time interval between receiving processes. The time interval between receiving processes can be controlled by changing the value of the intermittent reception cycle or by switching between connection and disconnection of communication, for example. Concrete examples of this operation will be described next by taking as examples the first to third operation examples.

4-1. First Operation Example

First, in the first operation example, the content transmission apparatus 10 controls the time interval between receiving processes performed by a reception unit by having the communication control unit 116 cause the reception unit to perform the receiving processes according to an intermittent reception cycle in accordance with the number of songs in queue indicated by wait information. Here, the intermittent reception cycle is determined to be a cycle which is longer as the number of songs in queue is larger. The operation of the content playback system 1 performed at this time will be described next by using FIGS. 6 and 7.

Figure 6:
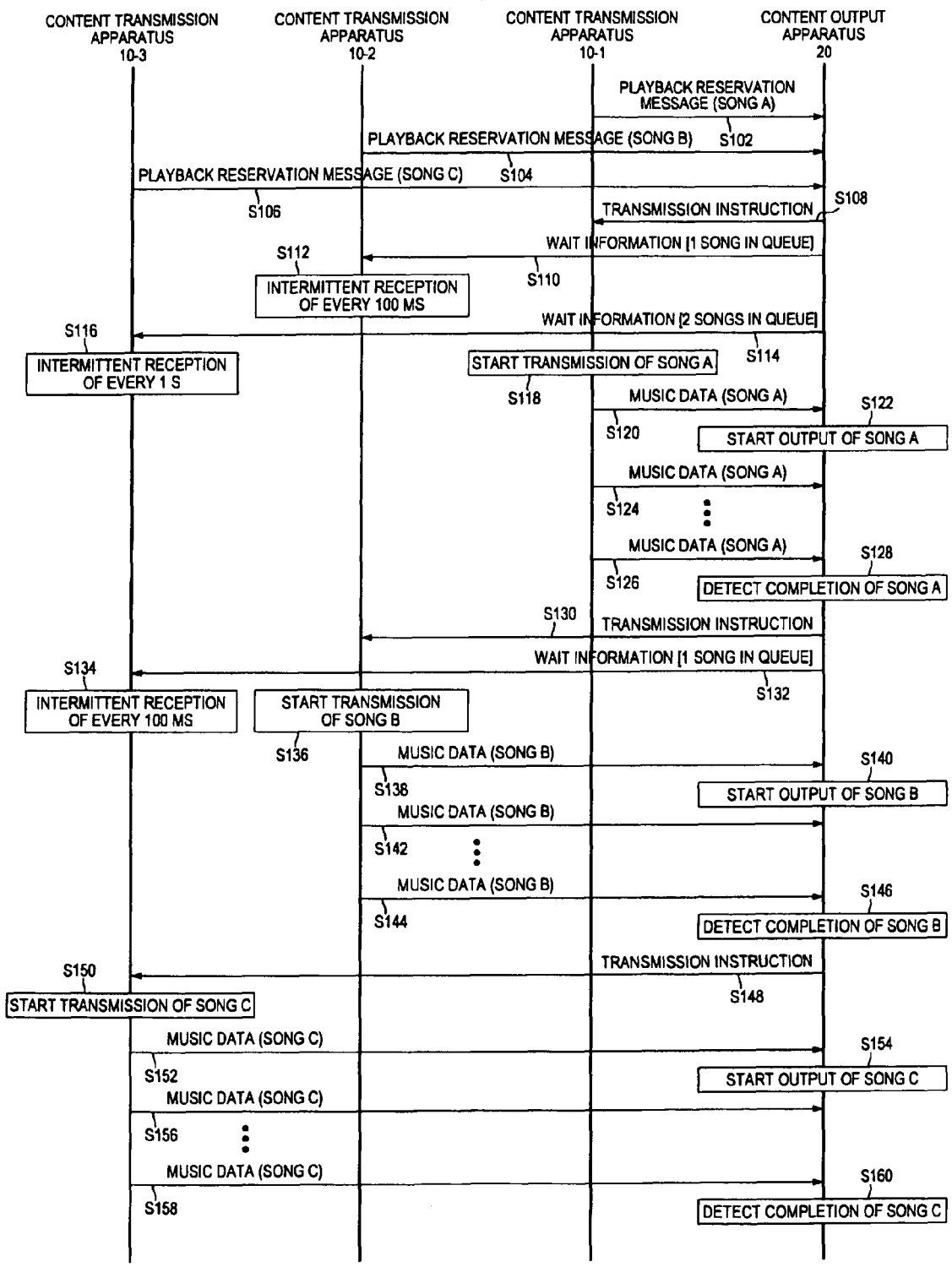
FIG. 6 is a sequence chart showing a first operation example of a content playback system according to an embodiment of the present invention.

FIG. 6 is a sequence chart showing a first operation example of the content playback system 1. Also, FIG. 7 is a table showing a relationship between the number of songs in queue and the intermittent reception cycle, used by the content transmission apparatus 10 in the first operation example. The communication control unit 116 of the content transmission apparatus 10 can determine the intermittent reception cycle by referring to the table shown in FIG. 7 stored, for example, in the memory 120.

First, the content transmission apparatuses 10 make playback reservations to the content output apparatus 20 in the order of the content transmission apparatus 10-1, the content transmission apparatus 10-2, and the content transmission apparatus 10-3. The playback reservations are made by pressing push buttons of the content transmission apparatuses 10 and the content output apparatus 20, for example. Then, playback reservation messages are transmitted from the content transmission apparatuses 10 (S102 to S106), and the content output apparatus 20 whose push button is pressed receives these playback reservation messages.

The content output apparatus 20 that accepted the playback reservation messages inputs, according to the order of the playback reservation messages, a transmission instruction to the content transmission apparatus 10-1 that is the apparatus having the content whose playback is to be started (S108). Also, the content output apparatus 20 transmits wait information indicating the number of songs in queue to the content transmission apparatuses 10 waiting to transmit content. For example, the content output apparatus 20 transmits, to the content transmission apparatus 10-2, wait information indicating that the number of songs in queue is 1 (S110). The content transmission apparatus 10-2 which has received this wait information determines the intermittent reception cycle to be 100 ms by referring to the table shown in FIG. 7, and performs intermittent reception every 100 ms (S112). Furthermore, the content output apparatus 20 transmits, to the content transmission apparatus 10-3, wait information indicating that the number of songs in queue is 2 (S114). The content transmission apparatus 10-3 which has received this wait information similarly refers to the table shown in FIG. 7, determines the intermittent reception cycle to be 1000 ms (that is, 1 s), and performs intermittent reception every 1 s (S116).

For its part, the content transmission apparatus 10-1 which has received the transmission instruction in step S108 starts transmission of content for which a playback reservation has been made (song A) to the content output apparatus 20, according to the transmission instruction (S118). When the content transmission apparatus 10-1 transmits the music data of song A to the content output apparatus 20 (S120), the content output apparatus 20 which has received the music data starts outputting song A (S122). The music data which is transmitted here is streaming data, and thus the content output apparatus 20 performs output while continuously receiving the streaming data (S124, S126).

Then, when playback completion of song A is detected, the content output apparatus 20 next inputs the transmission instruction to the content transmission apparatus 10-2 (S130), and transmits, to the content transmission apparatus 10-3, wait information indicating that the number of songs in queue has become 1 (S132). The content transmission apparatus 10-3 which has received the wait information in step S132 refers again to the table in FIG. 7, and determines the intermittent reception cycle. In this case, since the number of songs in queue is 1, the intermittent reception cycle is determined to be 100 ms, and intermittent reception is performed every 100 ms (S134).

The content transmission apparatus 10-2 which has received the transmission instruction in step S130 starts transmission of content for which a playback reservation has been made (song B) to the content output apparatus 20, according to the transmission instruction (S136). When the content transmission apparatus 10-2 transmits the music data of song B to the content output apparatus 20 (S138), the content output apparatus 20 which has received the music data starts outputting song B (S140). As in the case of the content transmission apparatus 10-1, the content transmission apparatus 10-2 transmits the music data of song B in a streaming format, and thus the content output apparatus 20 performs output while continuously receiving the streaming data (S142, S144).

Then, when playback completion of song B is detected, the content output apparatus 20 next inputs the transmission instruction to the content transmission apparatus 10-3 (S148). The content transmission apparatus 10-3 starts transmission of content for which a playback reservation has been made (song C) to the content output apparatus 20, according to the transmission instruction (S150). When the content transmission apparatus 10-3 transmits the music data of song C to the content output apparatus 20 (S152), the content output apparatus 20 starts playback of song C (S154). Transmission of the music data is continued until the playback completion of song C (S156, S158, S160).

4-2. Second Operation Example

Next, in the second operation example, the content transmission apparatus 10 controls the time interval between receiving processes performed by a reception unit by having the communication control unit 116 cause the reception unit to perform the receiving process according to an intermittent reception cycle in accordance with a wait time indicated by wait information. Here, the intermittent reception cycle is determined to be a cycle which is longer as the wait time is longer. The operation of the content playback system 1 performed at this time will be described next by using FIGS. 8 and 9.

Figure 8:
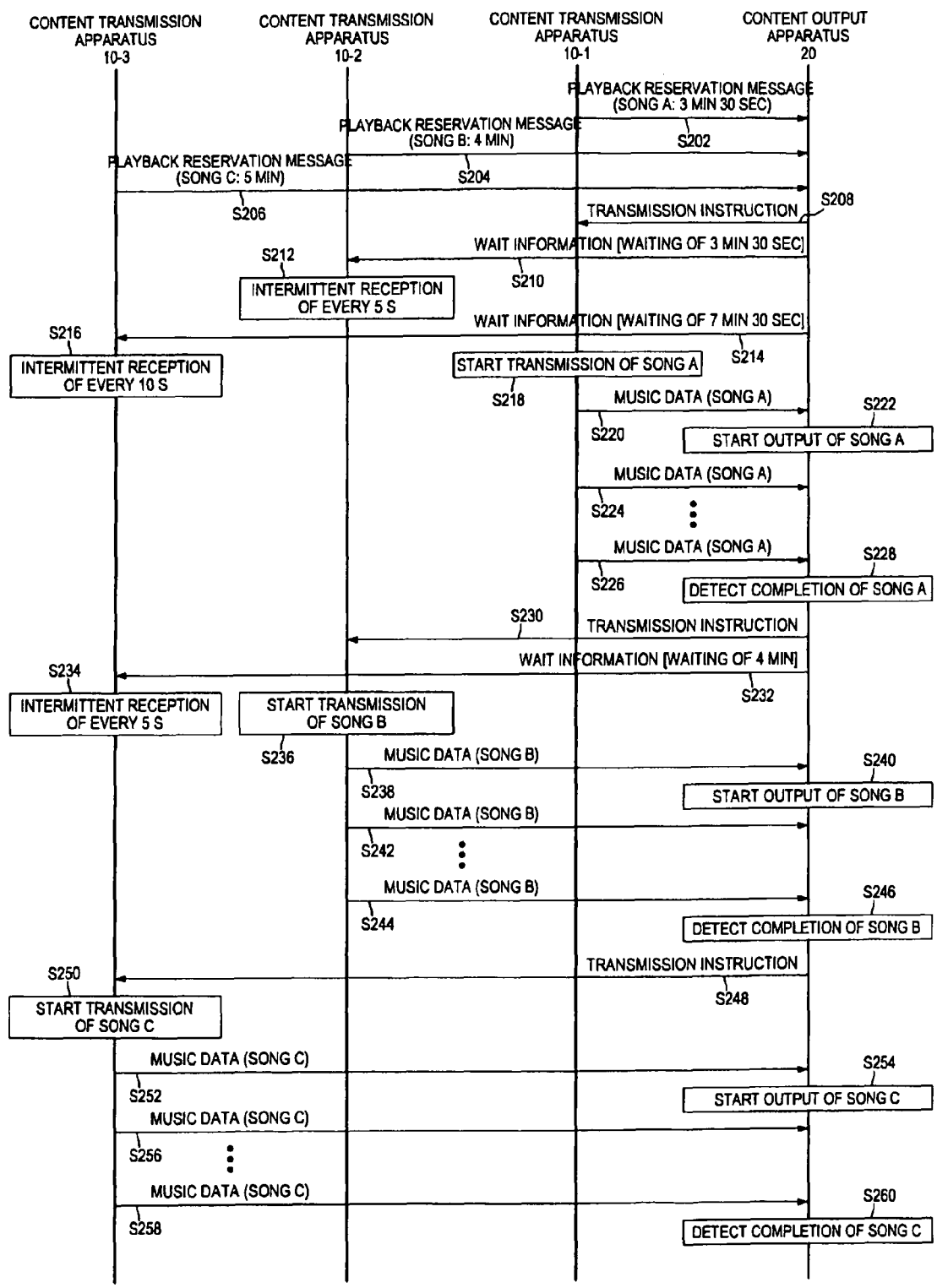
FIG. 8 is a sequence chart showing a second operation example of a content playback system according to an embodiment of the present invention.

FIG. 8 is a sequence chart showing a second operation example of the content playback system 1. Also, FIG. 9 is a table showing a relationship between the wait time and the intermittent reception cycle, used by the content transmission apparatus 10 in the second operation example.

Additionally, the second operation example of the content playback system 1 is different from the first operation example in that the intermittent reception cycle is determined in the first operation example according to the number of songs in queue, but the intermittent reception cycle is determined in the second operation example according to a wait time. The second operation example is the same as the first operation example in other respects, and explanation thereof will be omitted. In the following, the difference to the first operation example will be mainly described, with respect to a content playback operation.

The second operation example of the content playback system 1 is different from the first operation example in that a wait time is used as the wait information. Accordingly, a notification on the playback time of content for which a playback reservation is to be made is issued together with a playback reservation message from each content transmission apparatus 10 (S202 to S206).

The content output apparatus 20 inputs a transmission instruction to the content transmission apparatus 10-1 which is the apparatus having the content whose transmission is to be started, based on the output order of content data (S208). At the same time, the content output apparatus 20 transmits pieces of wait information expressed in wait time to the content transmission apparatus 10-2 and the content transmission apparatus 10-3 which will be placed in a wait state (S210, S214). For example, the content transmission apparatus 10-2 is placed in a wait state during playback of song A, and thus is notified that the wait time is the playback time of song A which is 3 minutes and 30 seconds. Also, the content transmission apparatus 10-3 is placed in a wait state during playback of song A and song B, and thus is notified that the wait time is 7 minutes and 30 seconds obtained by adding the playback time of song A, namely 3 minutes and 30 seconds, and the playback time of song B, namely 4 minutes.

The content transmission apparatus 10-2 and the content transmission apparatus 10-3 each refers to the table shown in FIG. 9 and determines the intermittent reception cycle based on the wait information. For example, the wait time is 3 minutes and 30 seconds for the content transmission apparatus 10-2, and thus the intermittent reception cycle will be 5000 ms (that is, 5 s). Also, the wait time is 7 minutes and 30 seconds for the content transmission apparatus 10-3, and thus the intermittent reception cycle will be 10000 ms (that is, 10 s). Accordingly, the content transmission apparatus 10-2 performs intermittent reception every 5 s (S212), and the content transmission apparatus 10-3 performs intermittent reception every 10 s (S216).

Then, a playback process of song A is performed as with the first operation example (S218 to S226). Then, when playback completion of song A is detected, the content output apparatus 20 next inputs the transmission instruction to the content transmission apparatus 10-2 (S230), and transmits, to the content transmission apparatus 10-3, wait information indicating that the wait time is 4 minutes (S232).

The content transmission apparatus 10-3 refers again to the table shown in FIG. 9 and determines the intermittent reception cycle, based on the wait information. In this case, since the wait time is 4 minutes, the intermittent reception cycle is determined to be 5 s. Accordingly, the content transmission apparatus 10-3 performs intermittent reception every 5 s (S234). Thereafter, the playback process will be performed similarly for song B and song C (S236 to S258).

In the foregoing, with reference to the first and second operation examples, examples have been described where the content transmission apparatus 10 controls the time interval between receiving processes performed by the reception unit by causing the reception unit to perform the receiving process in the intermittent reception cycle according to the status of wait. According to the third operation example described next, the content transmission apparatus 10 controls the time interval between the receiving processes performed by the reception unit by disconnecting the communication connection between the content transmission apparatus 10 and the content output apparatus 20 according to the status of wait.

4-3. Third Operation Example

Figure 10:
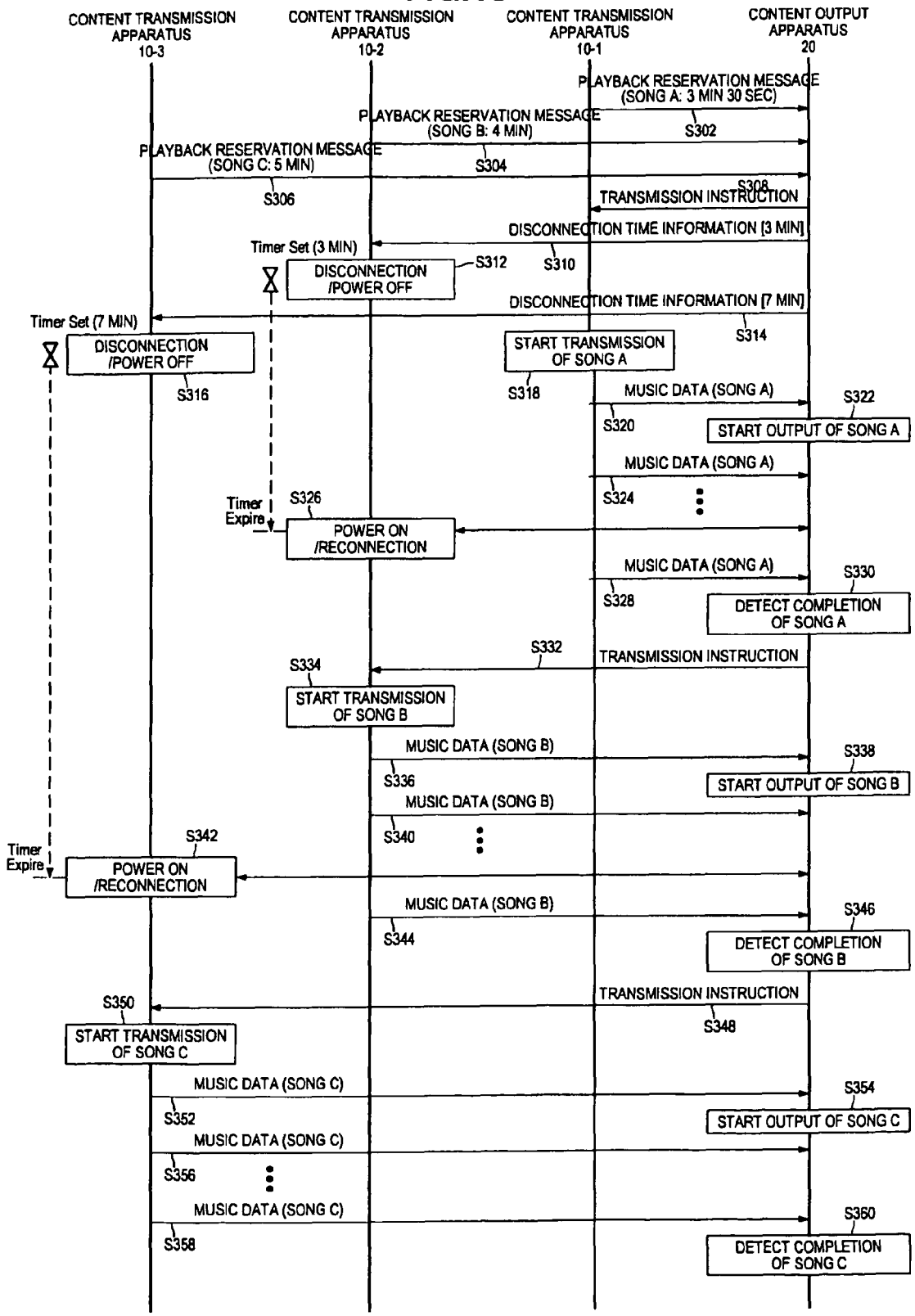
FIG. 10 is a sequence chart showing a third operation example of a content playback system according to an embodiment of the present invention.

FIG. 10 is a sequence chart showing the third operation example of the content playback system 1. Furthermore, FIG. 11 is a table showing a relationship between the number of songs in queue and a disconnection time, used by the content transmission apparatus 10 in a modified example of the third operation example.

The third operation example of the content playback system 1 controls the time interval between the receiving processes performed by the reception unit, by disconnecting the communication connection between the content transmission apparatus 10 and the content output apparatus 20 during a disconnection time according to wait information. To further reduce power consumption, power itself of a communication module of the content transmission apparatus 10 may be cut off during disconnection of the connection.

Referring to FIG. 10, first, playback reservations are made to the content output apparatus 20 by a plurality of content transmission apparatuses 10 in the order of the content transmission apparatus 10-1, the content transmission apparatus 10-2, and the content transmission apparatus 10-3. At this point, the content transmission apparatuses 10 each issue a notification on the playback time of content (S302 to S306).

The content output apparatus 20 determines a disconnection time according to a wait time, and notifies the same to each of the content transmission apparatus 10-2 and the content transmission apparatus 10-3 that are in wait state (S310, S314). This disconnection time is determined based on a predetermined formula. In the present operation example, the content transmission apparatus 10 performs reconnection to the content output apparatus 20 30 seconds before the start of transmission of content data.

Specifically, the content transmission apparatus 10-2 receives, from the content output apparatus 20, disconnection time information indicating that the disconnection time is 3 minutes (S310), and sets the received disconnection time on a timer. Then, the content transmission apparatus 10-2 disconnects the connection with the content output apparatus 20 and also cuts off power until the disconnection time has elapsed (S312). After the disconnection time which has been notified has elapsed, the content transmission apparatus 10-2 performs a process of reconnecting with the content output apparatus 20 (S326). Additionally, since, in the case of Wi-Fi Direct, for example, device discovery, Group Owner Negotiation, and security setup by WPS are already performed at the time of making a playback reservation, these processes may be omitted and Association may be performed instantly. In this case, an effect that the time until connection can be shortened can be achieved.

Similarly, the content transmission apparatus 10-3 receives, from the content output apparatus 20, disconnection time information indicating that the disconnection time is 7 minutes (S314), and sets the received disconnection time on a timer. Then, the content transmission apparatus 10-3 disconnects the connection with the content output apparatus 20 and also cuts off power until the disconnection time has elapsed (S316).

Additionally, in the example of FIG. 10, the content output apparatus 20 takes "wait time—30 seconds" as the disconnection time, but the present invention is not limited to such an example. The disconnection time may be determined by any method as long as the content transmission apparatus 10 can reconnect with the content output apparatus 20 before the start of transmission of content. For example, the content output apparatus 20 may determine the disconnection time according to the table, shown in FIG. 11, showing a relationship between the number of songs in queue and the disconnection time. Or, although not shown, a table showing a relationship between a wait time and the disconnection time may be held, and the disconnection time may be determined according to this table.

5. Example of Effect

In the foregoing, the configuration and operation examples of the content playback system according to an embodiment of the present invention have been described. According to the content playback system according to an embodiment of the present invention, the content output apparatus 20 managing the output order of content pieces urges start of transmission of content by inputting a transmission instruction to the content transmission apparatus 10 having content whose turn in the output order has come, and outputs the received content. Here, the content transmission apparatus 10 in a wait state can control the time interval between receiving processes performed to receive a transmission instruction.

The first method of controlling the time interval between the receiving processes is to control the intermittent reception cycle of the content transmission apparatus 10, as has been described with the first and second operation examples. Power consumption relating to the receiving process can be reduced by making this intermittent reception cycle longer as the wait time is longer or the number of songs in queue is larger.

The second method of controlling the time interval between the receiving processes is to disconnect the connection between the content transmission apparatus 10 and the content output apparatus 20 during a disconnection time of a length according to the wait information, as has been described with the third operation example. This enables to reduce power consumption relating to the receiving process because the receiving process is not performed while the connection between the content transmission apparatus 10 and the content output apparatus 20 is disconnected. Also, the content transmission apparatus 10 can further reduce power consumption by cutting off the power itself.

Furthermore, normally, when there is a limit on the number of child devices the content output apparatus 20 acting as a parent device can accommodate, only the reservations from the limited number of content transmission apparatuses 10 or less can be accepted. However, by temporarily disconnecting the connection to the content output apparatus 20 according to the status of wait, an effect can be achieved that reservations from more than the limited number of content transmission apparatuses 10 can be accepted.

It should be understood by those skilled in the art that various modifications, combinations, sub-combinations and alterations may occur depending on design requirements and other factors insofar as they are within the scope of the appended claims or the equivalents thereof.

For example, the content transmission apparatus 10 is assumed to be a mobile phone or a music playback apparatus in the operation examples described above, but it is not limited to such. For example, the content transmission apparatus 10 may also be an information processing apparatus, such as a personal computer (PC), a home video processing apparatus (such as a DVD recorder or a video cassette recorder), a personal digital assistant (PDA), a home game machine, a home appliance, a mobile phone, a personal handyphone system (PHS), a portable music playback device, a portable video processing device, a portable game machine, which includes a wireless communication function.

Furthermore, in the operation examples described above, the content transmission apparatus 10 and the content output apparatus 20 are assumed to connect with each other according to Wi-Fi Direct, but the present invention is not limited to such. The present invention is also realized by causing, in a general IEEE 802.11 wireless LAN system, a wireless communication apparatus acting as an Access Point to function as the content output apparatus 20 and a wireless communication apparatus acting as a Station to function as the content transmission apparatus 10.

Furthermore, the method of controlling the intermittent reception cycle and the method of disconnecting the connection to the content output apparatus 20 in the operation examples described above may be used in combination. When playback reservations are made to one content output apparatus 20 by the content transmission apparatus 10-1, the content transmission apparatus 10-2, the content transmission apparatus 10-3, and the content transmission apparatus 10-4 in this order, the content transmission apparatus 10-1 may start content transmission, the content transmission apparatus 10-2 may perform intermittent reception every 100 ms, the content transmission apparatus 10-3 may perform intermittent reception every 1 s, and the content transmission apparatus 10-4 may disconnect the connection and perform reconnection after the lapse of a predetermined time. Then, when playback of content of the content transmission apparatus 10-1 is finished, the content transmission apparatus 10-3 may move on to perform intermittent reception every 100 ms, and the content transmission apparatus 10-4 may move on to perform intermittent reception every 1 s.

Furthermore, in the operation examples described above, the content transmission apparatus 10 is assumed to make the playback reservation to the content output apparatus 20, but the present invention is not limited to such an example. For example, the content output apparatus 20 may refer to a list of content data held by each content transmission apparatus 10, and the playback reservation may be made at the content output apparatus 20. Also in this case, a transmission instruction for content and transmission of the wait information are performed based on the output order of content pieces.

Furthermore, in the operation examples described above, a case has been described where the content to be output is music content, but the present invention is not limited to such an example. For example, it may also be video content. In this case, an apparatus having a display or the like in addition to a speaker is used as the content output apparatus 20.

Furthermore, in the first and second operation examples described above, the content transmission apparatus 10 is assumed to determine the intermittent reception cycle by using a table showing a relationship between the wait information and the intermittent reception cycle, but the present invention is not limited to such an example. For example, the content output apparatus 20 may determine the intermittent reception cycle by using a similar table, and may notify the content transmission apparatus 10 of the intermittent reception cycle. In this case, the content transmission apparatus 10 perform the receiving process according to the intermittent reception cycle which has been notified.

Furthermore, in the second operation example described above, the content transmission apparatus 10 is assumed to change the cycle of intermittent reception at a timing of reception of the wait information from the content output apparatus 20, but the present invention is not limited to such an example. For example, the content transmission apparatus 10 may start counting the remaining wait time by an internal timer at a stage of first reception of the wait information. Then, the cycle of intermittent reception maybe changed spontaneously according to the change in the remaining time.

Furthermore, in the third operation example described above, the content transmission apparatus 10 is assumed to disconnect the connection to the content output apparatus 20, but the present invention is not limited to such an example. For example, the content output apparatus 20 may disconnect the connection to the content transmission apparatus 10 after issuing a notification on disconnection time information.

Furthermore, in the third operation example described above, the content output apparatus 20 is assumed to disconnect connection to all the content transmission apparatuses 10 that are in a wait state, but the present invention is not limited to such an example. For example, the content output apparatus 20 may hold a threshold X for determining whether connection is to be maintained or not, and, in a case X=2, for example, may notify a disconnection time to a terminal for which the number of songs in queue is 2 or more and disconnect the connection.

Furthermore, in the third operation example described above, the content output apparatus 20 is assumed to determine the disconnection time and notify the content transmission apparatus 10 of the same, but the present invention is not limited to such an example. For example, the content output apparatus 20 may notify the content transmission apparatus 10 of wait information indicating a status of wait, and the content transmission apparatus 10 may determine the disconnection time.

Moreover, in the present specification, the steps described in the flow charts include not only the processing performed chronologically in the described order, but also the processing performed in parallel or individually instead of being performed chronologically. Moreover, needless to say, the order may be changed as appropriate for the steps to be performed chronologically.

What is claimed is:

1. A content transmission apparatus, comprising:
a reception unit for performing a receiving process for receiving, from a content output apparatus, either a transmission instruction or wait information that is transmitted by the content output apparatus according to a position within an output order of pieces of content data of at least one piece of content data stored with the content transmission apparatus, the output order of pieces of content data being determined by an order in which the content output apparatus receives a playback reservation from the content transmission apparatus and at least another playback reservation from at least another content transmission apparatus, the reception unit receiving the wait information in response to at least another piece of content data being ahead of the at least one piece of content data in the output order, and the reception unit receiving the transmission instruction in response to no other piece of content data being ahead of the at least one piece of content data in the output order;
a transmission unit for starting transmission of the at least one piece of content data to the content output apparatus in response to the reception unit receiving the transmission instruction; and
a control unit for controlling a time interval for causing the reception unit to continue to perform the receiving process according to the wait information indicating a status of wait until the transmission unit is to start the transmission of the at least one piece of content data to the content output apparatus.

2. The content transmission apparatus according to claim 1, wherein the control unit causes the reception unit to perform the receiving process in accordance with an intermittent reception cycle according to the wait information.

3. The content transmission apparatus according to claim 2, wherein the reception unit receives the wait information from the content output apparatus, and the control unit determines the intermittent reception cycle based on the received wait information.

4. The content transmission apparatus according to claim 2, wherein the reception unit receives the intermittent reception cycle determined by the content output apparatus based on the wait information from the content output apparatus, and the control unit causes the reception unit to perform the receiving process according to the received intermittent reception cycle.

5. The content transmission apparatus according to claim 2, wherein the wait information includes at least a value of either a wait time until start of transmission of the content data to the content output apparatus or a number of content pieces in queue, and the intermittent reception cycle is determined to be longer when the value included in the wait information is larger.

6. The content transmission apparatus according to claim 1, wherein the control unit performs a process of reconnection to the content output apparatus after a disconnection time according to the wait information has elapsed since connection with the content output apparatus was disconnected.

7. The content transmission apparatus according to claim 6, wherein the control unit determines the disconnection time in accordance with the wait information, and performs, after the determined disconnection time has elapsed, the process of reconnection to the content output apparatus.

8. The content transmission apparatus according to claim 6, wherein the reception unit receives the disconnection time according to the wait information from the content output apparatus, and the control unit performs, after the received disconnection time has elapsed, the process of reconnection to the content output apparatus.

9. The content transmission apparatus according to claim 1, wherein the control unit performs control such that power supply to a communication module including the transmission unit and the reception unit is stopped during a disconnection time according to the wait information.

10. A content playback system, comprising:
a content output apparatus for managing an output order of pieces of content data according to an order in which the content output apparatus receives playback reservations from a plurality of content transmission apparatus having associated pieces of content data to be output, for giving either a transmission instruction or wait information to a given one of the plurality of content transmission apparatus based on a position in the output order of a respective piece of content data to be output by that content transmission apparatus, the content output apparatus giving the wait information in response to at least another piece of content data being ahead of the respective piece of content data in the output order, and the content output apparatus giving the transmission instruction in response to no other piece of content data being ahead of the respective piece of content data in the output order, and for outputting the content received from the content transmission apparatus; and
the given one of the plurality of content transmission apparatus including:
a reception unit for performing a receiving process for receiving at least one of the transmission instruction or the or wait information,
a transmission unit for starting transmission of the respective piece of content data to the content output apparatus in response to the reception unit receiving the transmission instruction, and
a control unit for controlling a time interval for causing the reception unit to continue to perform the receiving process according to the wait information indicating a status of wait until the transmission unit is to start the transmission of the content data to the content output apparatus.

11. A content transmission method, comprising:
receiving, by a content output apparatus, playback reservations from a plurality of content transmission apparatus having associated pieces of content data to be output;
transmitting, by the content output apparatus to a given one of the plurality of content transmission apparatus, wait information indicating a status of wait until transmission of respective content data stored with the content transmission apparatus to the content output apparatus is to be started, the content output apparatus transmitting the wait information in response to at least another piece of content data being ahead of the respective piece of content data in an output order, the output order being determined by an order in which the content output apparatus receives the playback reservations from the plurality of content transmission apparatus;
performing, by the given one of the plurality of content transmission apparatus, a receiving process at a time interval according to the transmitted wait information;
giving, by the content output apparatus, a transmission instruction to the given one of the plurality of content transmission apparatus in response to no other piece of content data being ahead of the respective content data in the output order; and
starting, by the given one of the plurality of content transmission apparatus, transmission of the content data to the content output apparatus in response to the transmission instruction.

12. A processor encoded with a computer program for causing a computer to function as a content transmission apparatus, including:
a reception unit for performing a receiving process for receiving, from a content output apparatus, either a transmission instruction or wait information that is transmitted by the content output apparatus according to a position within an output order of pieces of content data of at least one piece of content data stored with the content transmission apparatus, the output order of pieces of content data being determined by an order in which the content output apparatus receives a playback reservation from the content transmission apparatus and at least another playback reservation from at least another content transmission apparatus, the reception unit receiving the wait information in response to at least another piece of content data being ahead of the at least one piece of content data in the output order, and the reception unit receiving the transmission instruction in response to no other piece of content data being ahead of the at least one piece of content data in the output order;
a transmission unit for starting transmission of the at least one piece of content data to the content output apparatus in response to the reception unit receiving the transmission instruction; and
a control unit for controlling a time interval for causing the reception unit to continue to perform the receiving process according to the wait information indicating a status of wait until the transmission unit is to start the transmission of the at least one piece of content data to the content output apparatus.

13. The content transmission apparatus according to claim 1, further comprising:
a reservation unit for transmitting, to the content output apparatus, the playback reservation for the content output apparatus to play back the at least one piece of content data stored with the content transmission apparatus, the content output apparatus receiving the at least another playback reservation from the at least another content transmission apparatus prior to or subsequent to receiving the playback reservation from the content transmission apparatus.

* * * * *